United States Patent [19]

Guastella

[11] Patent Number: 5,558,421

[45] Date of Patent: Sep. 24, 1996

[54] DECORATIVE FIBER OPTIC LAMP

[76] Inventor: Michael V. Guastella, 1212 Quail Ct., Fillmore, Calif. 93015

[21] Appl. No.: 442,351

[22] Filed: May 16, 1995

[51] Int. Cl.$^6$ ...................................................... F21V 8/00
[52] U.S. Cl. .......................... 362/32; 362/283; 362/277; 362/293; 362/806; 362/359
[58] Field of Search .......................... 362/32, 283, 293, 362/806, 284, 282, 280, 277, 35, 351, 359, 307, 310, 311

[56] References Cited

U.S. PATENT DOCUMENTS

| | | |
|---|---|---|
| 4,080,045 | 3/1978 | Nakatsubo et al. . |
| 4,279,089 | 7/1981 | Murakami ................................ 362/806 |
| 4,454,568 | 6/1984 | Stadnik ..................................... 362/32 |
| 4,738,510 | 4/1988 | Sansom .................................... 362/32 |
| 4,747,022 | 5/1988 | Lin ........................................... 362/806 |
| 5,067,059 | 11/1991 | Hwang .................................... 362/32 |
| 5,104,608 | 4/1992 | Pickering ................................. 362/32 |
| 5,184,253 | 2/1993 | Hwang .................................... 362/32 |
| 5,226,709 | 7/1993 | Labranche ............................... 362/32 |
| 5,260,686 | 11/1993 | Kuo ......................................... 362/32 |
| 5,291,577 | 3/1994 | Zoscak ..................................... 362/32 |

OTHER PUBLICATIONS

Psycho Lite Owners Manual, Realistic Co.

*Primary Examiner*—Denise L. Gromada
*Assistant Examiner*—Thomas M. Sember
*Attorney, Agent, or Firm*—Michaelson & Wallace

[57] ABSTRACT

The present invention discloses a decorative fiber optic lamp including an enclosed base attached to a lamp shade. A motor has a rod connected to a special effects wheel located directly above a light source. The motor is connected to a transformer which is in turn connected to a power source for operating the motor to thereby rotate the wheel. An elongated fiber plug is located immediately above the light source and extends within the lamp shade. Light transmitters are bundled or joined within the fiber plug and extend from the center of the fiber plug through the top end of the fiber plug and at that point, expand outward or fan out in all directions into the lamp shade. Also, the fiber strands extend downward, thereby forming a tree-like appearance. Light is illuminated from the light source and modified as it travels through the special effects wheel and into the bottom of the fiber plug. As a result, special effects are generated within the lamp shade, thereby creating a decorative lamp.

15 Claims, 3 Drawing Sheets

DECORATIVE FIBER OPTIC LAMP

BACKGROUND OF THE INVENTION

1. Field of the Invention

The present invention relates, in general, to novelty lamps, and in particular fiber optic lamps.

2. Related Art

Novelty lamps, such as fiber optic lamps, have long been used for the decorative effects produced by the lamps at parties, nightclubs, and amusement parks. One example of such a lamp includes a fiber optic lamp having a cylindrical solid wood base with a light source attached in the center of the wood base. The cylindrical solid wood base has a hollow plastic elongated cylindrical section attached at the perimeter of the cylindrical wood base. Approximately one hundred and fifty fibers are located at the center of the plastic cylindrical section and extend therethrough and away from the light source. The fibers extend over the edge of the plastic cylindrical section and droop in a downward direction. Each fiber is approximately eighteen inches long. Light emitting from the light source travels through the fibers, from tip to tip. Since the fibers are spaced apart from each other, this lamp provides minimal light and is visible only in dark environments.

A second example of a fiber optic lamp is a lamp with the fibers arranged in the form of a flower. Some of the fibers are arranged within actual silk flowers and other fibers are arranged in the form of a flower. In most embodiments of this lamp, the flower at the base of the lamp is actually made of fibers and thus, the fiber tips of the flowers emit light. Other fiber flowers in the lamp are arranged around a base flower, and have silk flowers with fibers bundled inside, or fanned around, the silk flower.

This flower fiber optic lamp uses a rotating translucent color wheel located between the light source and the fibers and is comprised of various colors. The color wheel rotates to change the colors emitted at the tips of the fibers and to create a sparkling effect. Because the production costs of this lamp are relatively high, the number of flowers contained in this lamp are usually limited to four or five, and all the flowers must face one direction.

Also, since the flowers must all face in one direction to provide a full and vibrant appearance to the bouquet, it can only be viewed from certain directions and thus, can only be placed in limited areas, such as on a shelf. In addition, since the flower at the base of the lamp is very intricate, very small diameter fibers are needed. As a result of using such small diameter fibers, the lamp does not provide a good light source, and is rather obscure.

Another example of a novelty lamp is a disco-type lamp. A light source is enclosed by a translucent multi-colored rotatable cylinder with different shapes. A clear plastic dome covers the multi-colored cylinder and light source. The light emitted from the light source permeates through the multi-colored and shaped cylinder to thereby create a light show of various colored shapes on the walls and ceiling in the room where the lamp is located. Also, various colors on the cylinder allow the colors projected on the walls and ceiling from the lamp to change as the multi-colored cylinder rotates. Thus, the lamp itself is not a decoration. Instead, the purpose of the lamp is to decorate the lamp's surroundings.

Consequently, all of the lamps mentioned above are used in dark environments. In addition, the flower fiber optic lamp is costly. Further, the disco-type lamp cannot contain the light within the unit itself.

Therefore, what is needed is a decorative fiber optic lamp which can be used in dark as well as lighter environments. What is also needed is a fiber optic lamp that is not costly. What is further needed is a fiber optic lamp that displays decorations within the lamp and not onto its room surroundings. What is further needed is a decorative lamp that can be seen from all directions.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention discloses a decorative fiber optic lamp.

The lamp of the present invention includes an enclosed base attached to a lamp shade. A light source is mounted on a pedestal and located at a center section within the base. A motor, located adjacent the pedestal, has a rod connected to a special effects wheel which is located directly above the light source. The motor is also connected to a transformer which is in turn connected to a power source for operating the motor, thereby rotating the wheel.

In addition, an elongated fiber plug is located immediately above the light source and extends within the lamp shade. Light transmitters are bundled or joined within the fiber plug and extend from the center of the fiber plug through the top end of the fiber plug and at that point, expand outward or fan out in all directions into the lamp shade. Also, the fiber strands extend down toward the base of the lamp, thereby forming a tree-like appearance.

Light is illuminated from the light source and modified as it travels through the special effects wheel and into the bottom of the fiber plug. The modified light is sent through the fiber plug and into entrance tips of the fiber optic strands. Exit tips, located at opposite ends, release the modified light toward the inner surface of the lamp.

The special effects wheel is located directly above the light source and has various shades of colors, including black or opaque, located on different sections of the wheel. As the wheel rotates, the light source illuminates white light onto the section of the wheel above or aligned with the light source. Consequently, since the wheel is constantly rotating, varying colors of light are modified and projected from the wheel as the wheel rotates. Each different color projected by the wheel and traveling through the fiber optic strands is based on the location of the shade or color section of the wheel directly above or aligned with the light source. As a result, special effects are generated within the lamp shade, thereby creating a decorative lamp.

An object of the present invention is to provide an inexpensive decorative fiber optic lamp which can be used in dark as well as lighter environments.

A feature of the present invention is to have a special effects device for modifying light. Another feature of the present invention is to have varying intensities of light illuminated.

An advantage of the present invention is that the lamp of the present invention can be used in both dark and light environments. Another advantage of the present invention is that several special effects can be created. Yet another advantage of the present invention is that it can be placed in any location and is not limited to certain viewing directions.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
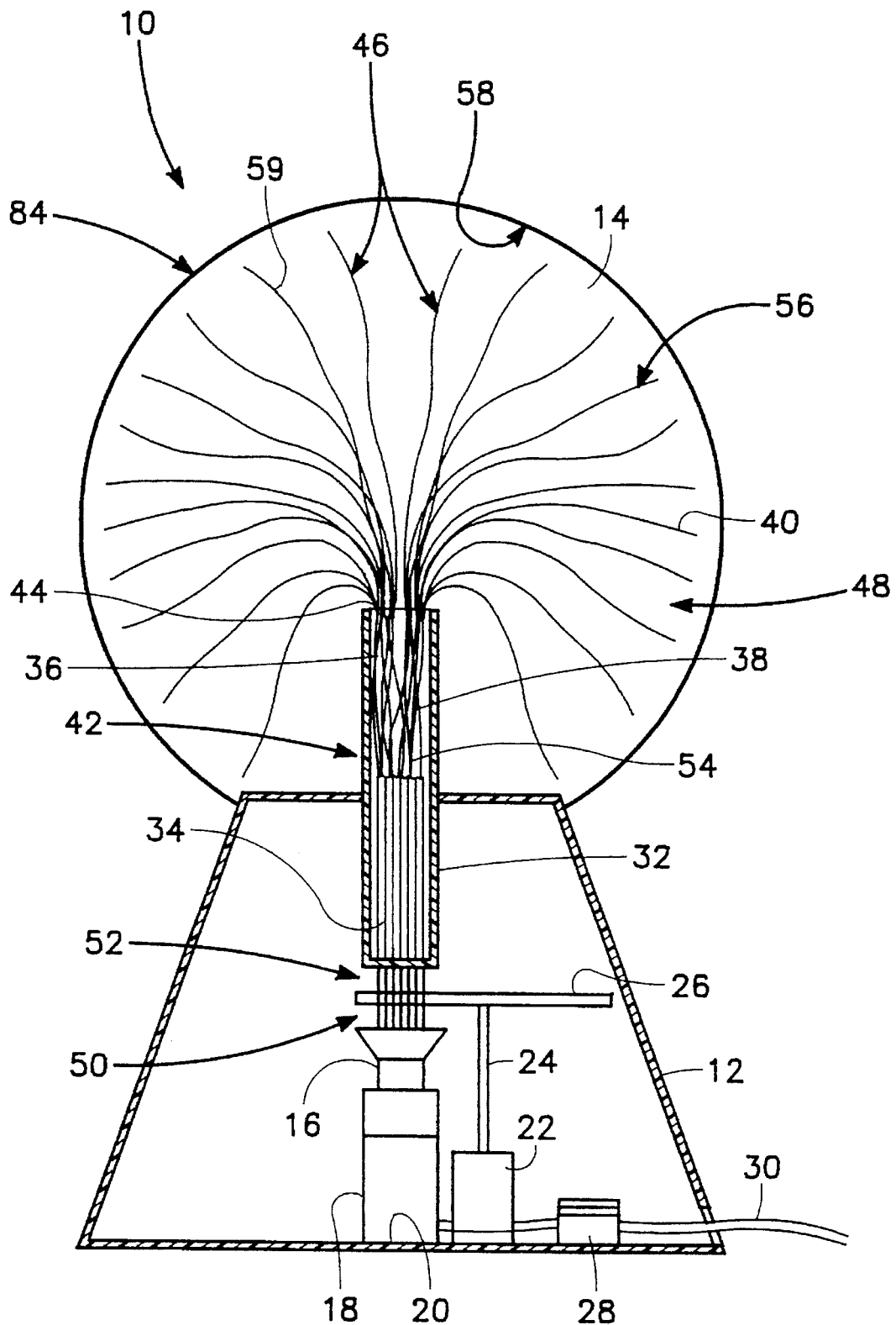
FIG. 1 illustrates a cross-sectional view of the present invention, including the interior components.

FIG. 1 illustrates a cross-sectional view of the present invention, including the interior components. The lamp 10 of the present invention includes an enclosed base 12 attached to a lamp shade 14, such as a spherical shaped globe, but can be of many different shapes and sizes. The enclosed base 12 can be opaque or translucent and can be of many different shapes and sizes. A light source 16, such as a light bulb ranging from 8 to 50 watts, is mounted on a pedestal 18 and located at a center section 20 within the base 12. A light of less than 8 watts can be used if it is a prefocused lamp with a narrow intense beam of light. The size of the light bulb can vary.

A motor 22, located adjacent the pedestal 18, has a rod 24 connected to a special effects wheel 26, such as a glass or plexiglass wheel. The wheel 26 is located directly above the light source 16. The motor 22 is connected to a transformer 28 which is in turn connected to a power source 30 for operating the motor 22 and rotating the wheel 26.

In addition, a bottom end 34 of an elongated fiber plug 32 is located immediately above the light source 16 and extends to a top end 36 within the globe. Light transmitters 38, such as transparent cylindrical fiber strands 46, are bundled or joined within the fiber plug 32 and extend from a center 42 of the fiber plug 32 at a trunk location 42 and through the top end 36 of the fiber plug 32. As a result, from within the center of the globe, the fiber strands 46 expand outward or fan out in all directions from the top end 36 of the fiber plug 32. Also, the fiber strands 46 extend downward, thereby forming a tree-like appearance.

Referring to FIG. 1, light 50 is illuminated from the light source 16 and modified 52 as it travels through the special effects wheel 26 and the bottom 34 of the fiber plug 32. The modified light 52 is sent through the trunk 42 of the fiber plug, where the bundled fiber strands 38 are located. Entrance tips 54 located at the trunk 42 of the bundled fiber optic strands 38 receive the modified light, while exit tips 56, located at opposite ends, release the modified light toward the inner surface 58 of the lamp shade or globe. Also, fiber optic strands with light emitting sides 59 can be used. Each light emitting side 59 can vary in distance from the inner surface 58 of the lamp shade 14 so that a faint ring is visible from the outside of the lamp, thereby creating a sparkling effect.

Figure 2:
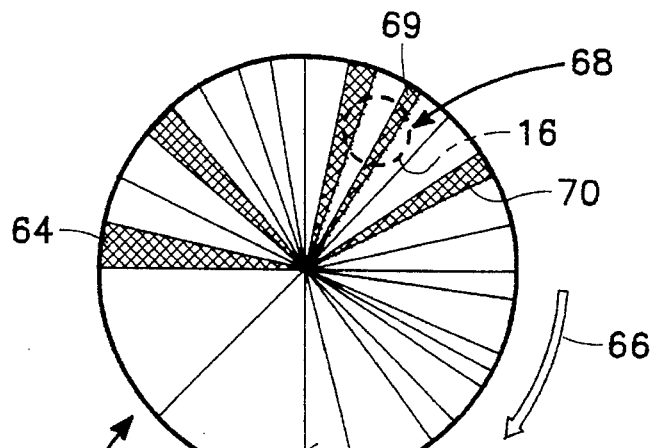
FIG. 2 illustrates the special effects wheel component of the present invention.

FIG. 2 illustrates the special effects wheel 60 of the present invention. The special effects wheel 60 is located directly above the light source 16 and can be a translucent multi-colored rotating glass or plexiglass wheel having various sections 62 with different shades of colors, including black 64 or opaque, located on different sections of the wheel 60. The opaque and color sections 62 and 64 can be for example, pie shaped sections, single lines, or circular dots.

As the wheel 60 rotates 66, the light source 16 illuminates white light 68 onto the section 69 or sections of the wheel 60 above or aligned with the light source 16. Consequently, since the wheel is constantly rotating, varying colors of light are modified and projected from the wheel as the wheel 60 rotates 66. Each different color projected by the wheel 60 and through the fiber optic strands is based on the location of the shade or color section 69 of the wheel 60 directly above or aligned with the light source. In addition, the opaque sections 64 of the wheel 60 block light 68 from passing through the wheel 60.

As a result, when the opaque or black section 69 of the rotating wheel 60 is aligned with the light source, no light is projected by the wheel 60 at that moment and strands of a fiber are "shut off" temporarily. Thereafter, when the opaque section 70 of the rotating wheel is no longer aligned with the light source, light will reenter the fiber strands and illuminate the exit tips of the fiber optic strands. This process continually repeats since the special effects wheel 60 is constantly rotating 66. Also, when several fibers are grouped together, some fibers are deprived of light, while others continue to receive light, thereby causing a sparkling effect because the opaque section of the rotating wheel 60 does not block light through all of the bundled fibers simultaneously.

Figure 3:
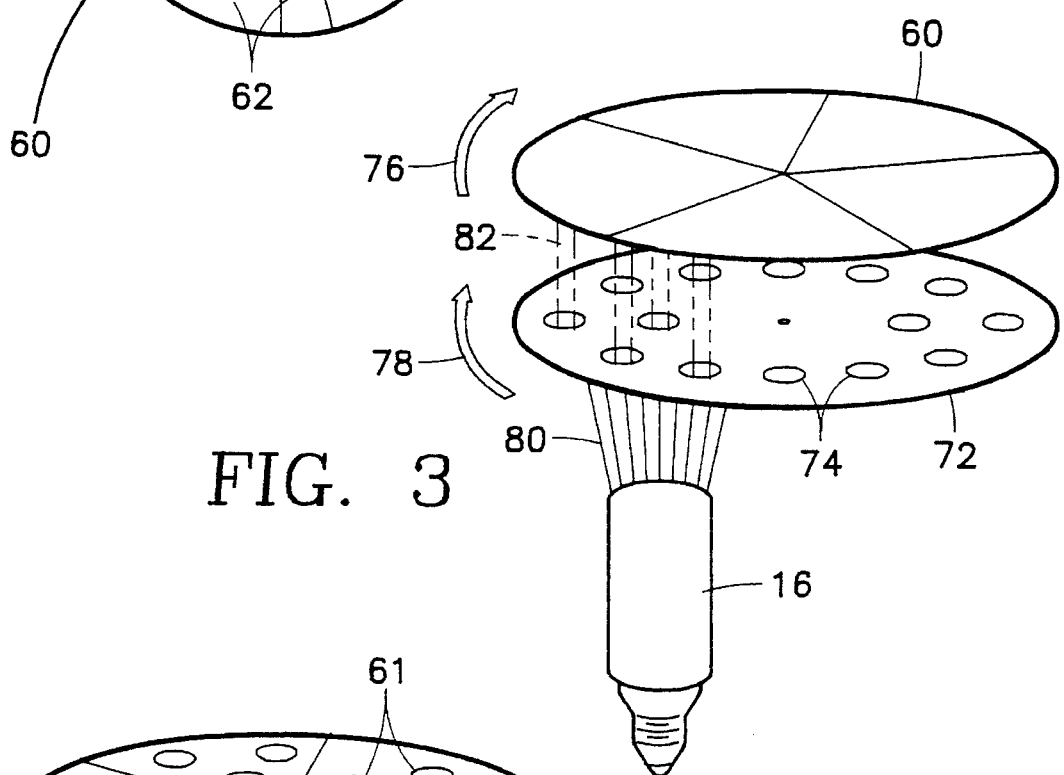
FIG. 3 illustrates an alternative special effects wheel configuration of an alternative embodiment of the present invention.

FIG. 3 illustrates an alternative special effects wheel 60 configuration of an alternative embodiment of the present invention. Several modifications can be made to the special effects wheel 60 to obtain a desired effect. First, the sparkling effect of the lamp can be modified by altering the size and frequency of the opaque sections on the color wheel 60. For example, small and thin opaque sections can be implemented on the special effects wheel so that the fibers will turn on and off intermittently quickly, thereby making the sparkling effect very rapid and not very visible. However, if the opaque sections are larger, the light will not pass through certain fiber for a longer period of time, while passing through other fibers, thereby creating more of a sparkling effect.

Figure 5:
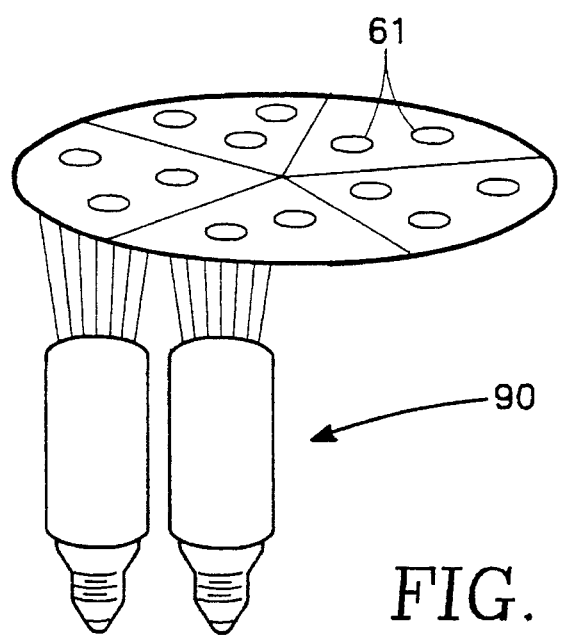
FIG. 5 illustrates an alternative embodiment of the present invention.

Further, an additional filter wheel 72, such as a heat-resistant, opaque plastic wheel with several random holes 74, can be located directly between the special effects wheel 60 and the light source 16. In one embodiment, there can be limited or no space between the filter wheel 72 and the special effects wheel 60. Also, the filter wheel 72 and the special effects wheel 60 can be attached. In addition, the special effects wheel 60, can have random holes 61 located directly on the special effects wheel 60, as shown in FIG. 5.

The two wheels could both be connected to the rod 24 of the motor 22 of FIG. 1 to thereby rotate both wheels at the same speed. Alternatively, a separate rod or a separate motor with a rod can be connected to the filter wheel to thereby rotate the wheels at different speeds. As a result, the light source 16 illuminates 80 periodically 82 through the holes 74 of the filter wheel 72 and into the special effects wheel 60, which in turn modifies the light projected into the fiber optic strands, thereby creating a sparkling effect.

Further, the special effects wheel 60 can be located approximately one eighth to one quarter of an inch above the filter wheel 72. This space between the wheels 60 and 72 would allow the heat from the light source 16 to rise through the holes 74 in the filter wheel 72 and around the special effects wheel 60, thereby cooling the lamp base 12 and preventing heat damage to the components.

Figure 4:
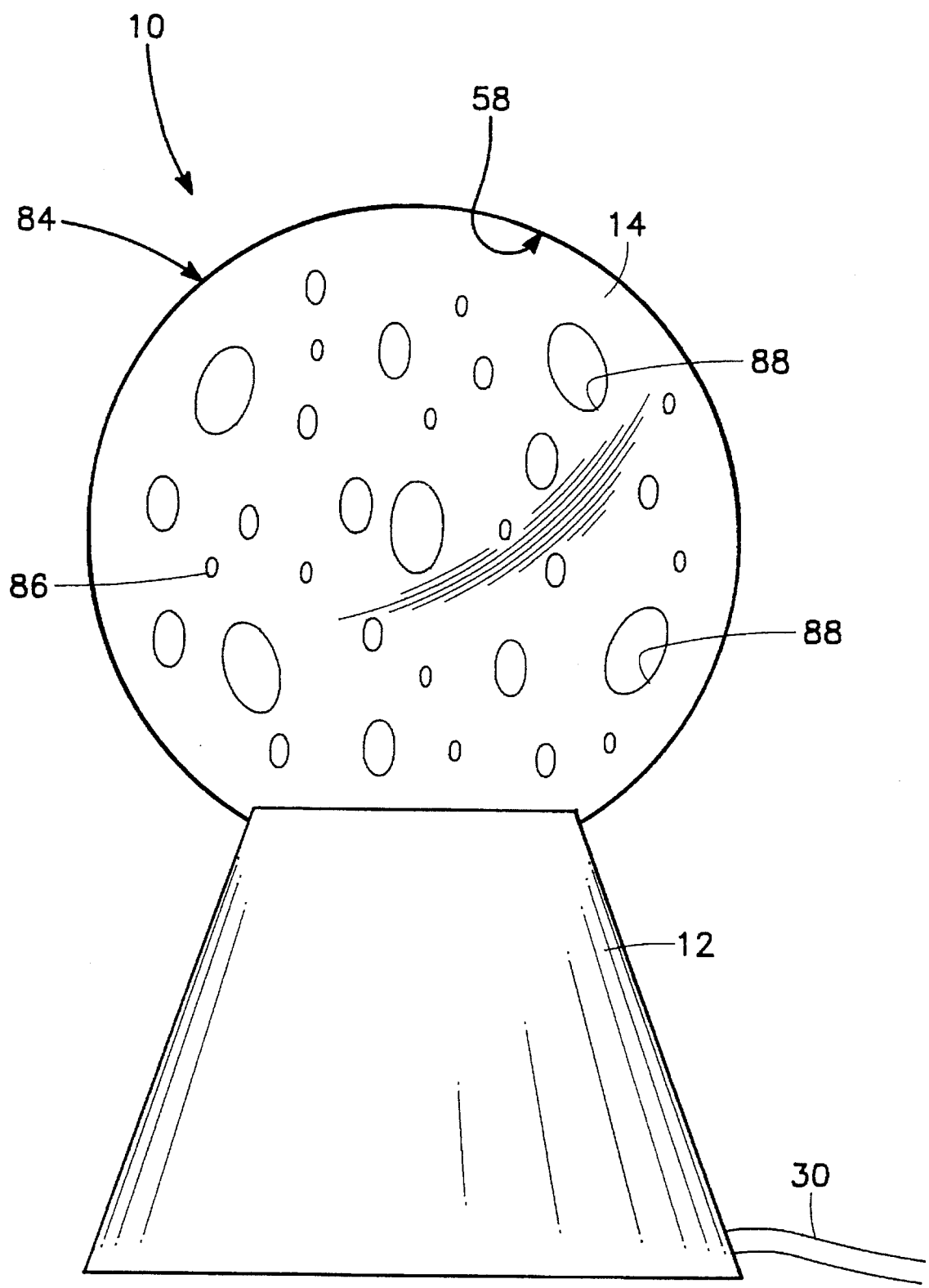
FIG. 4 illustrates the interaction of the of the lamp shade and the interior components of the present invention.

FIG. 4 illustrates the interaction of the of the lamp shade 14 and the interior components of the present invention. The inner surface 58 of the globe 14 refracts the modified light from the tips of the fiber strands through the globe 14 to an outer surface 84 of the globe 14. The intensity of the light exhibited on the outer surface 84 of the globe 14 is determined by the distance the individual fiber strand tip 56 is from the inner surface 58 of the globe 14 (as shown in FIG. 1).

For example, the tips of the fiber strands which are in close proximity to the inner surface of the globe create small intense circles 86 of light on the outer surface 84 of the globe 14. The tips of fiber strands which are further from the inner surface 58 of the globe 14 create larger circles 88 of light on the outer surface 84 of the globe 14. In addition, the circles of light on the outer surface 84 of the globe 14 will flash on and off and change colors when the special effects wheel rotates based on the description above. Thus, the lamp 10 of the present invention is easily visible in dim and dark conditions, and can be visible in brighter environments if a higher intensity light source is used.

Also, since the fiber optic strands fan out in all directions, the lamp has a full and vibrant appearance. Further, the diameter of the fiber strands used in the lamp can be very large so that abundant light passes through the fiber optic strands, thereby making the lamp very visible, even in lighter environments. In addition, extremely large diameter fiber strands can be used to increase the visibility and brightness of the lamp.

FIG. 5 illustrates an alternative embodiment of the present invention. Alternatively, two or more light sources 90 can be implemented on the pedestal within the enclosed base. Additional light sources will increase the intensity of light sent through the fiber optic stands, thereby increasing the brightness and special effects of the lamp.

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A decorative fiber optic lamp, comprising:

an enclosed base;

a translucent lamp shade removably connected to said enclosed base;

a pedestal located within said enclosed base;

a light source attached to said pedestal and for illuminating light;

an elongated hollow fiber plug having a bottom end extending from said light source to a top end within said lamp shade;

a plurality fiber optic strands bundled together within said fiber plug and having an entrance tip and an exit tip, wherein each of said fiber optic strand extends through said top end of said elongated fiber plug into said lamp shade;

special effects means located between said light source and said fiber plug for intermittently modifying said illuminated light and projecting said modified illuminated light through said fiber plug, whereby said modified illuminated light travels through each fiber strand from said entrance tip of said fiber strand to said exit tip near said lamp shade; and means for rotating said special effects means so that varying effects of modified light are projected from the special effects means through said fiber strands;

wherein some of said exit tips of said fiber strands are located in close proximity to an inner surface of said translucent lamp shade to create small circles of light on said outer surface of said translucent lamp shade and wherein some of said exit tips of said fiber strands are located in far proximity to said inner surface of said translucent lamp shade to create large circles of light on said outer surface of said translucent lamp shade.

2. The invention as set forth in claim 1, wherein said light source is a light bulb.

3. The invention as set forth in claim 2, wherein said light source is a plurality of light bulbs.

4. The invention as set forth in claim 1, wherein said special effects means is a multi-colored wheel having varying sections of translucent color located on said wheel.

5. The invention as set forth in claim 4, wherein said multi-colored wheel further includes opaque sections on said wheel.

6. The invention as set forth in claim 1, wherein said exit tips of said fiber strands fan out in all directions within said lamp shade and droop down toward said enclosed base.

7. The invention as set forth in claim 1, wherein said enclosed base is translucent.

8. The invention as set forth in claim 1, wherein said filter wheel is attached to said special effects wheel.

9. The invention as set forth in claim 1, further comprising a filter wheel having a plurality of apertures, said filter wheel being located between said light source and said special effects means for intermittently modifying said light source before said light source passes through said special effects means.

10. A decorative fiber optic lamp, comprising:

an enclosed base;

a lamp shade removably connected to said enclosed base;

a pedestal located within said enclosed base;

a light source attached to said pedestal and for illuminating light;

an elongated hollow fiber plug having a bottom end extending from said light source to a top end within said lamp shade;

a plurality fiber optic strands bundled together within said fiber plug and having an entrance tip and an exit tip, wherein each of said fiber optic strand extends through said top end of said elongated fiber plug into said lamp shade;

special effects means located between said light source and said fiber plug for intermittently modifying said illuminated light and projecting said modified illuminated light through said fiber plug, whereby said modified illuminated light travels through each fiber strand from said entrance tip of said fiber strand to said exit tip near said lamp shade;

means for rotating said special effects means so that varying effects of modified light are projected from the special effects means through said fiber strands;

a filter wheel, located between said light source and said special effects means, for intermittently modifying said light source before said light source passes through said special effects means; and wherein said filter wheel further comprises a plurality of apertures for modifying said light from said light source.

11. A decorative fiber optic lamp, comprising:

an enclosed base;

a lamp shade removably attached to said enclosed base;

a pedestal located within said enclosed base having a light source for illuminating light;

a plurality of fiber optic strands bundled together, wherein each of said fiber optic strand has an entrance tip located adjacent said light source, an exit tip located near said lamp shade, and a side spanning from said entrance tip to said exit tip;

connecting means for holding said plurality of bundled fiber optic strands together and for guiding said bundled fiber optic strands through said enclosed base and into said lamp shade;

special effects means, located between said light source and said connecting means, for intermittently modifying said illuminated light and projecting said modified illuminated light through said connecting means, wherein said modified illuminated light travels through each fiber strand from said entrance tip of said fiber strand to said exit tip near said lamp shade, thereby illuminating said side and said exit tip;

means for rotating said special effects means so that varying effects of modified light are projected from the special effects means through said fiber strands; and a filter wheel, located between said light source and said special effects means, for intermittently modifying said light source before said light source passes through said special effects means, wherein said filter wheel comprises a plurality of apertures for modifying said light from said light source.

12. The invention as set forth in claim 11, wherein said light source is a light bulb.

13. The invention as set forth in claim 12, wherein said light source is a plurality of light bulbs.

14. The invention as set forth in claim 11, wherein said special effects means is a multi-colored wheel having varying translucent color and opaque sections located on said wheel.

15. The invention as set forth in claim 11, wherein said sides of said plurality of fiber optic strands located near said exit tips vary in distance from said lamp shade.

* * * * *